US006976355B2

(12) United States Patent
Imada et al.

(10) Patent No.: US 6,976,355 B2
(45) Date of Patent: Dec. 20, 2005

(54) EXHAUST-GAS CLEANING DEVICE FOR ENGINE

(75) Inventors: Michihiro Imada, Aki-gun (JP); Masayuki Kuroki, Aki-gun (JP); Masahiko Shigetsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 670 days.

(21) Appl. No.: 10/080,619

(22) Filed: Feb. 25, 2002

(65) Prior Publication Data

US 2002/0119080 A1 Aug. 29, 2002

(30) Foreign Application Priority Data

Feb. 27, 2001 (JP) .............................. 2001-051758

(51) Int. Cl.[7] .............................................. F01N 3/00
(52) U.S. Cl. ............................ 60/285; 60/276; 60/284; 60/297; 60/299
(58) Field of Search .......................... 60/276, 284, 285, 60/286, 297, 299, 301

(56) References Cited

U.S. PATENT DOCUMENTS 5,979,157 A * 11/1999 Kinugasa et al. ............. 60/274
6,047,544 A * 4/2000 Yamamoto et al. ........... 60/285
6,170,260 B1 * 1/2001 Ishii et al. ..................... 60/297
6,185,933 B1 * 2/2001 Tsuzuki et al. ............... 60/285
6,220,018 B1 * 4/2001 Yamanashi et al. ........... 60/285
6,490,859 B2 * 12/2002 Kakuyama et al. ........... 60/285
6,601,383 B2 * 8/2003 Hasegawa et al. ............. 60/276

FOREIGN PATENT DOCUMENTS

JP 11-082111 3/1999

* cited by examiner

*Primary Examiner*—Binh Q. Tran
(74) *Attorney, Agent, or Firm*—Nixon Peabody LLP; Donald R. Studebaker

(57) ABSTRACT

An exhaust-gas cleaning device for an engine comprises an HC-adsorbing catalytic converter disposed in an exhaust passage, the HC-adsorbing catalytic converter including an HC-adsorbing material which adsorbs HC contained in exhaust gas at low temperatures and releases adsorbed HC as the temperature increases, an oxygen storage material which occludes oxygen when the concentration of oxygen in the exhaust gas is high and releases occluded oxygen as the oxygen concentration drops, and a three-way catalys metal layer which oxidizes HC released from the HC-adsorbing material, and an oxygen concentration controller which controls the oxygen concentration in the exhaust gas on the upstream side of the HC-adsorbing catalytic converter in such a manner that oxygen is released from the oxygen storage material when the engine is in an operating condition in which HC is released from the HC-adsorbing material.

7 Claims, 8 Drawing Sheets

EXHAUST-GAS CLEANING DEVICE FOR ENGINE

BACKGROUND OF THE INVENTION AND RELATED ART STATEMENT

The present invention relates to an exhaust-gas cleaning device for an engine capable of decreasing hydrocarbons (HC) contained in engine exhaust gases, the exhaust-gas cleaning device comprising an HC-catalytic converter which adsorbs and converts HC.

An example of a conventional air-fuel ratio control device for an internal combustion engine is disclosed in Japanese Unexamined Patent Publication No. 11-82111, in which an HC-catalytic converter including an HC-adsorbing material and a three-way catalyst layer formed on top of the HC-adsorbing material is placed in an exhaust passage, the air-fuel ratio control device having an air-fuel ratio controller for controlling the air-fuel ratio of an intake air-fuel mixture of the internal combustion engine in such a manner that the air-fuel ratio of exhaust gas at a downstream end portion of the HC-catalytic converter is increased (air-fuel mixture gas becomes "lean") by a specified amount during release of HC from the HC-adsorbing material. In this air-fuel ratio control device, the air-fuel ratio at the downstream end portion of the HC-catalytic converter is controlled to increase by the specified amount during release of HC taking into account the difference between a rate at which HC released from the HC-adsorbing material dissipates into the three-way catalyst layer and a rate at which oxygen contained in the exhaust gas is taken into the three-way catalyst layer, so that at least such an amount of oxygen that is necessary for oxidizing the released HC is adsorbed on the surface of the three-way catalyst layer and HC released from the HC-adsorbing material is converted.

In the aforementioned air-fuel ratio control device which is so constructed as to control the air-fuel ratio of the intake air-fuel mixture of the internal combustion engine such that the air-fuel ratio at the downstream end portion of the HC-catalytic converter is increased (air-fuel-mixture gas becomes "lean") by the specified amount during release of HC from the HC-adsorbing material, it is possible to decrease HC released from the HC-adsorbing material by causing it to react with oxygen contained in the exhaust gas if a catalytic element provided in the HC-catalytic converter is activated. It is to be noticed, however, that although the HC-adsorbing material begins to release HC at temperatures of about 150° C. to 200° C., the catalytic element of the HC-catalytic converter is activated at about 250° C. or above even when a low-temperature-activation catalyst is used. This produces a problem that HC released from the HC-adsorbing material before activation of the catalytic element cannot be decreased by causing sufficient reaction with oxygen in the exhaust gas.

SUMMARY OF THE INVENTION

In the light of the foregoing, it is an object of the invention to provide an exhaust-gas cleaning device for an engine capable of efficiently decreasing HC released from an HC-adsorbing material at relatively low temperatures.

According to the invention, an exhaust-gas cleaning device for an engine comprises an HC-adsorbing catalytic converter disposed in an exhaust passage, the HC-adsorbing catalytic converter including an HC-adsorbing material which adsorbs HC contained in exhaust gas at low temperatures and releases adsorbed HC as the temperature increases, an oxygen storage material which occludes oxygen when the concentration of oxygen in the exhaust gas is high and releases occluded oxygen as the oxygen concentration drops, and an oxidizing catalytic metal which oxidizes HC released from the HC-adsorbing material, and an oxygen concentration controller which controls the oxygen concentration in the exhaust gas on the upstream side of the HC-adsorbing catalytic converter in such a manner that oxygen is released from the oxygen storage material when the engine is in an operating condition in which HC is released from the HC-adsorbing material.

In this construction, the oxygen concentration controller performs feedback control operation to set a relatively high average air-fuel ratio in a combustion chamber of the engine, causing the oxygen concentration in the exhaust gas upstream of the HC-adsorbing catalytic converter to drop, when the engine is in the operating condition in which HC is released from the HC-adsorbing material. Therefore, as HC is released from the HC-adsorbing material with temperature increase, oxygen having high reactivity is released from the oxygen storage material and HC released from the HC-adsorbing material is converted at relatively low temperatures thanks to the catalytic effect of the oxidizing catalytic metal using oxygen having the high reactivity.

In one form of the invention, the oxygen concentration controller controls the engine in such a manner that the oxygen concentration in the exhaust gas on the upstream side of the HC-adsorbing catalytic converter becomes equal to or less than 0.3% when the engine is in the operating condition in which HC is released from the HC-adsorbing material.

As the oxygen concentration controller performs control operation to make the oxygen concentration in the exhaust gas on the upstream side of the HC-adsorbing catalytic converter equal to or less than 0.3% when the engine is in the operating condition in which HC is released from the HC-adsorbing material in this construction, oxygen having high reactivity is released from the oxygen storage material and HC released from the HC-adsorbing material is efficiently converted at relatively low temperatures thanks to the catalytic effect of the oxidizing catalyst using oxygen having the high reactivity.

In another form of the invention, the oxygen concentration controller includes an air-fuel ratio controller for controlling average air-fuel ratio in a combustion chamber of the engine, wherein the air-fuel ratio controller controls the engine in such a manner that a value corresponding to the ratio between the oxygen concentration and the concentration of a reducing agent contained in the exhaust gas flowing into the HC-adsorbing catalytic converter becomes appropriate for creating an exhaust gas atmosphere which is obtained by burning a mixture at an average air-fuel ratio of 14.7 or less in the combustion chamber so that oxygen is released from the oxygen storage material when the engine is in the operating condition in which HC is released from the HC-adsorbing material.

In this construction, the oxygen concentration controller performs control operation to make the value corresponding to the ratio between the oxygen concentration and the reducing agent concentration in the exhaust gas flowing into the HC-adsorbing catalytic converter to match a specific value when the engine is in the operating condition in which HC is released from the HC-adsorbing material and, therefore, oxygen having high reactivity is released from the oxygen storage material and HC released from the HC-adsorbing material is efficiently converted at relatively low temperatures thanks to the catalytic effect of the oxidizing catalyst using oxygen having the high reactivity.

In another form of the invention, the oxygen concentration controller includes an air-fuel ratio controller for controlling average air-fuel ratio in a combustion chamber of the engine, wherein the air-fuel ratio controller controls the engine in such a manner that a value corresponding to the ratio between the oxygen concentration and the concentration of a reducing agent contained in the exhaust gas flowing into the HC-adsorbing catalytic converter becomes appropriate for creating an exhaust gas atmosphere which is obtained by burning a mixture at an average air-fuel ratio between 13.5 and 14.5 in the combustion chamber so that oxygen is released from the oxygen storage material when the engine is in the operating condition in which HC is released from the HC-adsorbing material.

In this construction, the oxygen concentration controller performs control operation to set the value corresponding to the ratio between the oxygen concentration and the reducing agent concentration in the exhaust gas flowing into the HC-adsorbing catalytic converter as stated above when the engine is in the operating condition in which HC is released from the HC-adsorbing material and, therefore, oxygen having high reactivity is efficiently released from the oxygen storage material and HC released from the HC-adsorbing material is efficiently converted at relatively low temperatures thanks to the catalytic effect of the oxidizing catalyst using oxygen having the high reactivity. In addition, this construction prevents deterioration of the quality of engine emissions due to an extreme increase in the amounts of raw HC and carbon monoxide (CO) discharged from the engine into the exhaust passage.

In another form of the invention, the oxygen concentration controller controls the engine in such a manner that the oxygen concentration in the exhaust gas on the upstream side of the HC-adsorbing catalytic converter matches a set value without becoming alternately higher and lower than the set value.

This construction helps prevent a decrease in the amount of oxygen released from the oxygen storage material due to a temporary increase in the oxygen concentration and constantly maintain satisfactory HC-converting performance when the engine is in the operating condition in which HC is released from the HC-adsorbing material.

In another form of the invention, the air-fuel ratio controller performs feedback control operation for making the average air-fuel ratio in the combustion chamber alternately higher and lower than a set air-fuel ratio based on the oxygen concentration in the exhaust gas on the upstream side of the HC-adsorbing catalytic converter, wherein feedback control gain for air-fuel ratio control operation performed by the air-fuel ratio controller is set to a small value when the engine is in the operating condition in which HC is released from the HC-adsorbing material than when the engine is in an operating condition in which releasing of HC from the HC-adsorbing material has finished.

This construction helps prevent creation of an oxygen-rich atmosphere in the exhaust gas on the upstream side of the HC-adsorbing catalytic converter and causes the oxygen storage material to release oxygen when the engine is in the operating condition in which HC is released from the HC-adsorbing material. Since the converting effect of the oxidizing catalytic metal which uses oxygen thus released is enhanced, HC released from the HC-adsorbing material is efficiently converted at relatively low temperatures.

In still another form of the invention, the HC-adsorbing material is disposed on a carrier of the HC-adsorbing catalytic converter and an oxidizing catalyst layer is formed on the outside of the HC-adsorbing material.

When HC adsorbed by the HC-adsorbing material is released from it as a result of temperature increase, HC is oxidized due to the catalytic effect of the oxidizing catalytic metal before HC thus released is mixed with the exhaust gas flowing through the exhaust passage in this construction. Therefore, HC is efficiently converted when the engine is in the operating condition in which HC is released from the HC-adsorbing material.

In yet another form of the invention, the oxygen storage material is contained in the oxidizing catalyst layer.

In this construction, HC released from the HC-adsorbing material is combined with, or oxidized by, oxygen having high reactivity released from the oxygen storage material contained in the oxidizing catalyst layer when the engine is in the operating condition in which HC is released from the HC-adsorbing material and, therefore, HC-converting performance of the HC-adsorbing catalytic converter is further improved.

These and other objects, features and advantages of the invention will become more apparent upon reading the following detailed description in conjunction with the accompanying drawings.

DETAILED DESCRIPTION OF THE PREFERRED EMBODIMENTS OF THE INVENTION

Figure 1:
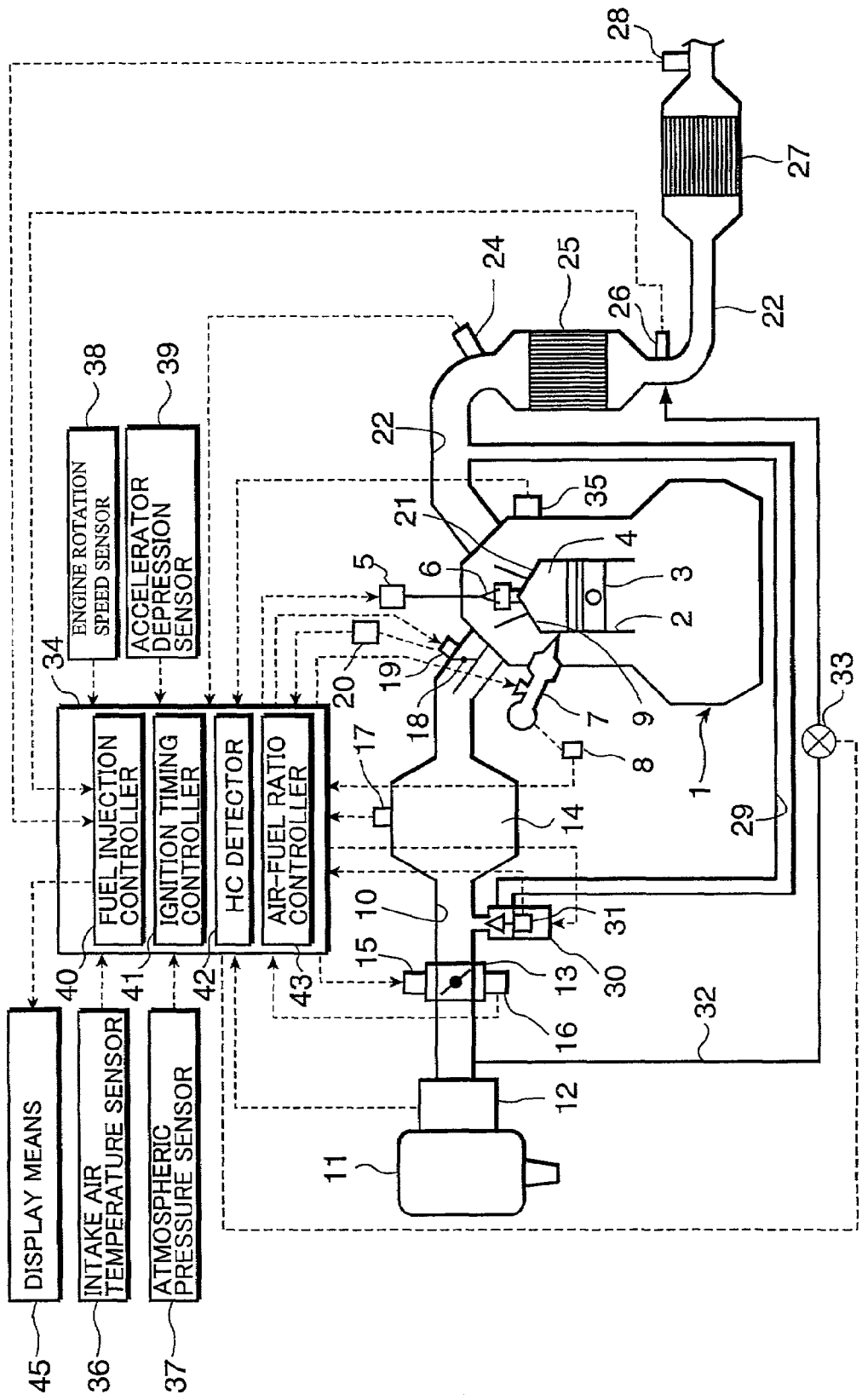
FIG. 1 is an explanatory diagram showing an exhaust-gas cleaning device for an engine according to a preferred embodiment of the invention.

FIG. 1 shows a direct injection gasoline engine provided with an exhaust-gas cleaning device according to a preferred embodiment of the invention. An engine body 1 has a plurality of cylinders 2 in which pistons 3 are fitted in such a manner that the pistons 3 can reciprocate in the respective cylinders 2. There is formed a combustion chamber 4 in each cylinder 2 immediately above the piston 3. A spark plug 6 connected to an ignition circuit 5 is fitted at a specific position of an upper wall of the combustion chamber 4 such that a spark gap of the spark plug 6 is located within the combustion chamber 4.

An injector (fuel injection device) 7 for injecting fuel directly into the combustion chamber 4 is mounted in a surrounding wall portion of the combustion chamber 4. A high-pressure fuel injection pump and a fuel supply circuit including a pressure regulator, which are not illustrated, are connected to the injector 7. Fuel supplied from a fuel tank is delivered to the injector 7 at an appropriate pressure regulated by the fuel supply circuit. The fuel supply circuit is also provided with a fuel pressure sensor 8 for detecting fuel pressure.

The combustion chamber 4 in each cylinder 2 is connected to an intake passage 10 through an intake port in which an intake valve 9 is provided. An air cleaner 11 for filtering intake air, an airflow sensor 12 for detecting the amount of intake air, an electrically-operated throttle valve 13 for constricting the intake passage 10 and a surge tank 14 are disposed in this order in the intake passage 10 from its upstream side to downstream side. The electrically-operated throttle valve 13, which is not mechanically linked to an unillustrated accelerator pedal, is opened and closed by a motor 15. The electrically-operated throttle valve 13 is associated with a throttle opening sensor 16 for detecting the opening of the throttle valve 13 while the surge tank 14 is associated with an intake air pressure sensor 17 for detecting the pressure of the intake air.

The intake passage 10 branches out downstream of the surge tank 14 into independent passages connected to the individual cylinders 2. A downstream terminal portion of each independent passage further branches out into two separate channels which are individually connected to the intake port, and a swirl valve 18 is provided in one of these separate channels. When the swirl valve 18 driven by an actuator 19 is closed, intake air is supplied to the combustion chamber 4 only through the other separate channel, thereby producing a strong swirl of intake air within the combustion chamber 4. On the contrary, as the swirl valve 18 is opened, the intake air swirl gradually diminishes. The swirl valve 18 is associated with a swirl valve opening sensor 20 for detecting the opening of the swirl valve 18. In one alternative, a tumble valve for creating a tumble within the combustion chamber 4 may be provided instead of the swirl valve 18.

The combustion chamber 4 of each cylinder 2 is connected to an exhaust passage 22 through an exhaust port in which an exhaust valve 21 is provided, an upstream terminal portion of the exhaust passage 22 branching out to the individual cylinders 2. A first oxygen concentration sensor 24 for measuring the concentration of oxygen in exhaust gas, a conventional three-way catalytic converter 25 capable of converting not only HC but also carbon monoxide (CO) and nitrogen oxides (NOx) contained in the exhaust gas, a second oxygen concentration sensor 26 for measuring the concentration of oxygen in the exhaust gas on the downstream side of the three-way catalytic converter 25, an HC-adsorbing catalytic converter 27 which adsorbs and converts HC contained in the exhaust gas and a third oxygen concentration sensor 28 for measuring the concentration of oxygen in the exhaust gas on the downstream side of the HC-adsorbing catalytic converter 27 are disposed in this order in the exhaust passage 22 from its upstream side to downstream side.

The first to third oxygen concentration sensors 24, 26, 28 detect air-fuel ratios at respective points based on the concentration of oxygen in the exhaust gas. The oxygen concentration sensors 24, 26, 28 are λ sensors whose outputs significantly change (are inverted) depending on whether the exhaust gas is lean or rich with respect to the stoichiometric air-fuel ratio and, therefore, a high degree of detecting accuracy is obtained with these sensors close to the stoichiometric air-fuel ratio. In one variation of the embodiment, linear $O_2$ sensors whose outputs vary linearly with the air-fuel ratio may be used instead of the λ sensors.

Figure 2:
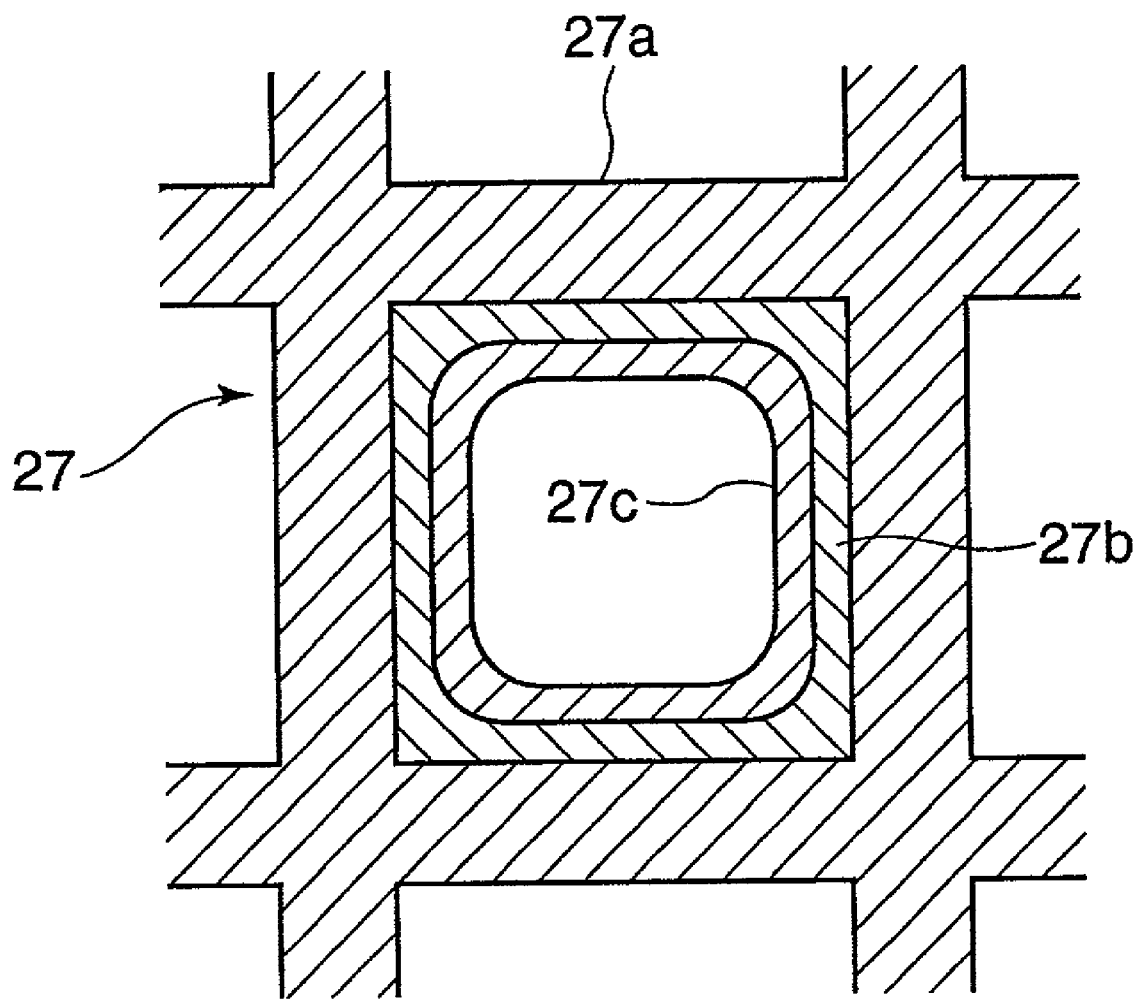
FIG. 2 is an explanatory diagram showing a specific construction of HC-adsorbing catalytic converter.

The HC-adsorbing catalytic converter 27 has the function of adsorbing and converting HC discharged from the engine particularly during cold starting. The HC-adsorbing catalytic converter 27 includes a carrier 27a having a honeycomb structure made of cordierite, a layer of HC-adsorbing material 27b formed on inside walls of each through hole made in the carrier 27a, and a three-way catalyst layer 27c coated or otherwise formed on the surface of the HC-adsorbing material 27b as shown in FIG. 2.

The HC-adsorbing material 27b is made of so-called β-type zeolite in which a large number of pores having a diameter of about 7.2 Å suited for adsorbing and retaining HC in the exhaust gas are formed, the β-type zeolite being impregnated with silver (Ag). The HC-adsorbing material 27b thus constructed adsorbs HC contained in the exhaust gas at low temperatures during cold engine starting, for instance, and releases adsorbed HC as the temperature increases. The β-type zeolite is impregnated with silver to enhance its HC-adsorbing effect and to enable itself to retain HC up to higher temperatures.

The three-way catalyst layer 27c contains catalytic metal, such as palladium (Pd) or platinum (Pt), carried by alumina, for instance, and a binder made of zirconium (Zr), for instance. The three-way catalyst layer 27c is activated when heated to a specific temperature and performs the function of oxidizing HC and CO contained in the exhaust gas and decreasing NOx contained therein by reducing it. The three-way catalyst layer 27c exhibits this converting function most significantly at about the stoichiometric air-fuel ratio.

The three-way catalyst layer 27c further contains an oxygen storage material which occludes oxygen when heated to a specific temperature and activated in an oxygen-containing atmosphere, in which the concentration of oxygen in the exhaust gas is high (e.g., 0.5% or above), and releases occluded oxygen as the concentration of oxygen in the exhaust gas drops. The oxygen storage material may be a ceria material including a composite oxide made of ceric oxide ($CeO_2$) or cerium (Ce) and rare-earth metal like praseodymium (Pr), for example. As the three-way catalyst layer 27c performs an oxidizing effect using oxygen released from the oxygen storage material, HC released from the HC-adsorbing material 27b is oxidized and decreased at relatively low temperatures.

The engine is provided with an exhaust gas recirculation (EGR) passage 29 for returning part of the exhaust gas back into the intake passage 10. Specifically, an upstream end of the EGR passage 29 is connected to the upstream side of the first oxygen concentration sensor 24 and a downstream end of the EGR passage 29 is connected to a point of the intake passage 10 between the electrically-operated throttle valve 13 and the surge tank 14. An EGR valve 30 whose opening can be electrically adjusted and a lift sensor 31 for detecting the lift of the EGR valve 30 are fitted in the EGR passage 29. The EGR passage 29, the EGR valve 30 and the lift sensor 31 together constitute an exhaust recirculating system.

Further, a secondary air supply passage 32 for feeding part of intake air directly from the intake passage 10 to an upstream point of the HC-adsorbing catalytic converter 27 is connected to the exhaust passage 22, and a flow control valve 33 which is opened and closed in accordance with a control signal output from an electronic control unit (ECU) 34 is provided in the secondary air supply passage 32.

Output signals from the airflow sensor 12, the throttle opening sensor 16, the intake air pressure sensor 17, the swirl valve opening sensor 20, the first to third oxygen concentration sensors 24, 26, 28 and the lift sensor 31 for detecting the lift of the EGR valve 30 are entered into the ECU 34 for performing overall control of the engine. Also, sensing signals output from a water temperature sensor 35 for detecting the temperature of engine cooling water, an intake air temperature sensor 36 for detecting the temperature of the intake air, an atmospheric pressure sensor 37 for detecting atmospheric pressure, an engine rotation speed sensor 38 for detecting engine speed, and an accelerator depression sensor 39 for detecting the amount of depression of the accelerator pedal are entered into the ECU 34.

The ECU 34 comprises a fuel injection controller 40 for controlling fuel injection from the injector 7 according to engine operating conditions, an ignition timing controller 41 for controlling the timing of ignition of mixture by the spark plug 6, an HC detector 42 for detecting how much HC is released from the HC-adsorbing material 27b of the HC-adsorbing catalytic converter 27, and an oxygen concentration controller including an air-fuel ratio controller 43 for controlling the concentration of oxygen in the exhaust gas by controlling the average air-fuel ratio in the combustion chamber 4 according to a sensing signal fed from the HC detector 42.

The fuel injection controller 40 is so constructed as to control the amount of fuel injected from the injector 7 according to the engine operating conditions. Specifically, when the engine is in a stratified charge combustion range under warm-running conditions, the fuel injection controller 40 causes the injector 7 to inject the fuel at one time at a specific point in time in a compression stroke so that the fuel is locally distributed around the injector 7 when burning, and controls combustion such that the fuel burns in stratified charge combustion mode in which the mixture is lean having an air-fuel ratio of about A/F=30, for example. In contrast, when the engine is in a uniform combustion range under warm-running conditions, the fuel injection controller 40 causes the injector 7 to inject the fuel at one time in an intake stroke and controls combustion such that the fuel burns in uniform charge combustion mode with the average air-fuel ratio in the whole combustion chamber 4 approximately equaling the stoichiometric air-fuel ratio. The embodiment may be modified such that the fuel is separately injected in the intake stroke and compression stroke in a medium-load, medium-speed range of the engine.

When it has been verified that the engine is under cold-running conditions in which the HC-adsorbing catalytic converter 27 adsorbs and releases HC, the fuel injection controller 40 controls the injector 7 such that it makes at least two-cycle time-split injection during a period from the intake stroke to an ignition point including a later injection performed in a middle portion of the compression stroke or later and an earlier injection performed earlier than the later injection. The time-split injection may be made in all engine operating ranges under cold-running conditions. Moreover, the time-split injection in a high-load range may be such that the fuel is injected only in the intake stroke to satisfy engine output requirements. As an alternative, the engine need not necessary be of a direct injection type in which the fuel is injected directly into the combustion chamber 4 but may be of a type in which a mixture of intake air and fuel is fed into the combustion chamber 4.

The ignition timing controller 41 outputs a control signal to the ignition circuit 5 for controlling ignition timing according to engine operating conditions. Although the ignition timing controller 41 basically controls the ignition timing to achieve a minimum spark advance for best torque (MBT), the ignition point is retarded by a specified amount from the point of MBT, where necessary, when it has been verified by the HC detector 42 that the amount of HC released from the HC-adsorbing material 27b is relatively large.

The HC detector 42 is so constructed as to determine whether the engine is in an operating condition in which HC is released from the HC-adsorbing material 27b of the HC-adsorbing catalytic converter 27 based on a comparison between the temperature of the HC-adsorbing catalytic converter 27 and a preset reference temperature, wherein the temperature of the HC-adsorbing catalytic converter 27 is estimated from measured elapsed time from engine startup and how the engine has been operated from its startup. As an alternative, the HC detector 42 may be configured in such a manner that it determines whether the engine is in an operating condition in which HC is released from the HC-adsorbing material 27b based on the oxygen concentration detected by the third oxygen concentration sensor 28 which is disposed downstream of the HC-adsorbing catalytic converter 27.

The air-fuel ratio controller 43 is so constructed as to make the concentration of oxygen contained in the exhaust gas which comes into contact with the HC-adsorbing catalytic converter 27 equal to or lower than 0.3%, preferably 0.1% or less (almost 0%), when the HC detector 42 has determined that the engine is in the operating condition in which HC is released from the HC-adsorbing material 27b of the HC-adsorbing catalytic converter 27, that is, when the HC detector 42 has determined that the engine is in the operating condition in which HC adsorbed by the HC-adsorbing material 27b while the engine temperature is low immediately after startup, for instance, is released as a result of temperature increase of the HC-adsorbing material 27b. Specifically, if the oxygen concentration in the exhaust gas which comes into contact with the HC-adsorbing catalytic converter 27 is to be set to a fixed value, the air-fuel ratio controller 43 is set to create an exhaust gas atmosphere corresponding to a value corresponding to the ratio between the oxygen concentration and the concentration of reducing gases such as HC and CO in the exhaust gas when the mixture in the combustion chamber 4 is burnt with the average air-fuel ratio set to 14.9 or less, preferably 14.7 or less, and more preferably within a range of 14.0 to 14.5. In this case, the oxygen concentration in the exhaust gas becomes about 0.3% when the average air-fuel ratio in the combustion chamber 4 is 14.9, about 0.03% (theoretically 0%) when the average air-fuel ratio in the combustion chamber 4 is 14.7.

If it is intended to perform air-fuel ratio control operation producing perturbation of the average air-fuel ratio in the combustion chamber 4, the average air-fuel ratio is set to 14.6 or less, preferably about 13.5 to 14.5, to produce a slightly rich mixture and a specific amplitude of perturbation of the average air-fuel ratio about the set average air-fuel ratio is set, so that the average oxygen concentration in the exhaust gas which comes into contact with the HC-adsorbing catalytic converter 27 becomes equal to 0.3% or less. When the average air-fuel ratio about which the actual average air-fuel ratio is varied (perturbed) is set to 14.6, for example, an oxygen concentration of 0.3% or less is obtained by decreasing the amplitude of perturbation. By comparison, when the average air-fuel ratio about which the actual average air-fuel ratio is perturbed is smaller than 14.6, it is possible to avoid creation of an oxygen-rich atmosphere by setting the average oxygen concentration to 0.3% or less even if the amplitude of perturbation is increased.

The aforementioned air-fuel ratio control operation is performed by feedforward control, by which fuel injection and the amount of intake air are controlled, as well as by feedback control by which the amount of injected fuel and the amount of intake air are controlled based on a detection value of the second oxygen concentration sensor 26. This control operation makes it possible to release oxygen once adsorbed by the oxygen storage material of the HC-adsorbing catalytic converter 27. In ordinary air-fuel ratio control operation by feedback method wherein the average air-fuel ratio is perturbed centering on 14.7, the oxygen concentration in the exhaust gas is approximately 0.5% on average.

When the oxygen concentration in the exhaust gas is higher than 0.3%, the amount of oxygen flowing into the HC-adsorbing catalytic converter 27 is so large that it is difficult for the oxygen storage material to release oxygen. On the other hand, if the engine is controlled to create an exhaust gas atmosphere having an oxygen concentration (0%) and a reducing gas concentration which would be obtained when the mixture is burnt at an average air-fuel ratio of 13.5 or less, the amounts of HC and CO discharged from the engine significantly increase although releasing of oxygen from the oxygen storage material is accelerated. In this case, HC discharged from the engine itself combined with HC released from the HC-adsorbing material 27b can not be fully converted, and this develops a problem that HC is released into the atmosphere.

When a catalytic converter having an oxidizing function like the three-way catalytic converter 25 containing a noble metal, for instance, is disposed upstream of the HC-adsorbing catalytic converter 27, the temperature of the catalytic converter (e.g., the three-way catalytic converter 25) increases making it activated before HC is released from the HC-adsorbing material 27b of the HC-adsorbing catalytic converter 27. For this reason, even if the oxygen concentration in the exhaust gas discharged from the engine is 0.3% or above, oxygen is used up by the three-way catalytic converter 25 for oxidization of HC and CO. It is therefore possible to set the average air-fuel ratio (A/F) in the combustion chamber 4 to 15.5 (preferably 15.0 or less) in this arrangement. In this embodiment, the average air-fuel ratio (A/F) in the combustion chamber 4 is set to 14.5 to decreases NOx discharged from the engine although the three-way catalytic converter 25 is disposed upstream of the HC-adsorbing catalytic converter 27.

Further, when the HC detector 42 has determined that the engine operating condition in which HC adsorbed by the HC-adsorbing material 27b has finished, or when the HC detector 42 has determined that releasing of HC adsorbed by the HC-adsorbing material 27b has finished as a result of further temperature increase of the HC-adsorbing material 27b, control operation including the aforementioned feedforward control by which the average air-fuel ratio in the combustion chamber 4 is decreased to produce a slightly rich mixture is terminated, and the engine is transferred to a normal control state in which the amount of injected fuel is controlled by feedback control according to engine operating conditions.

Figure 3:
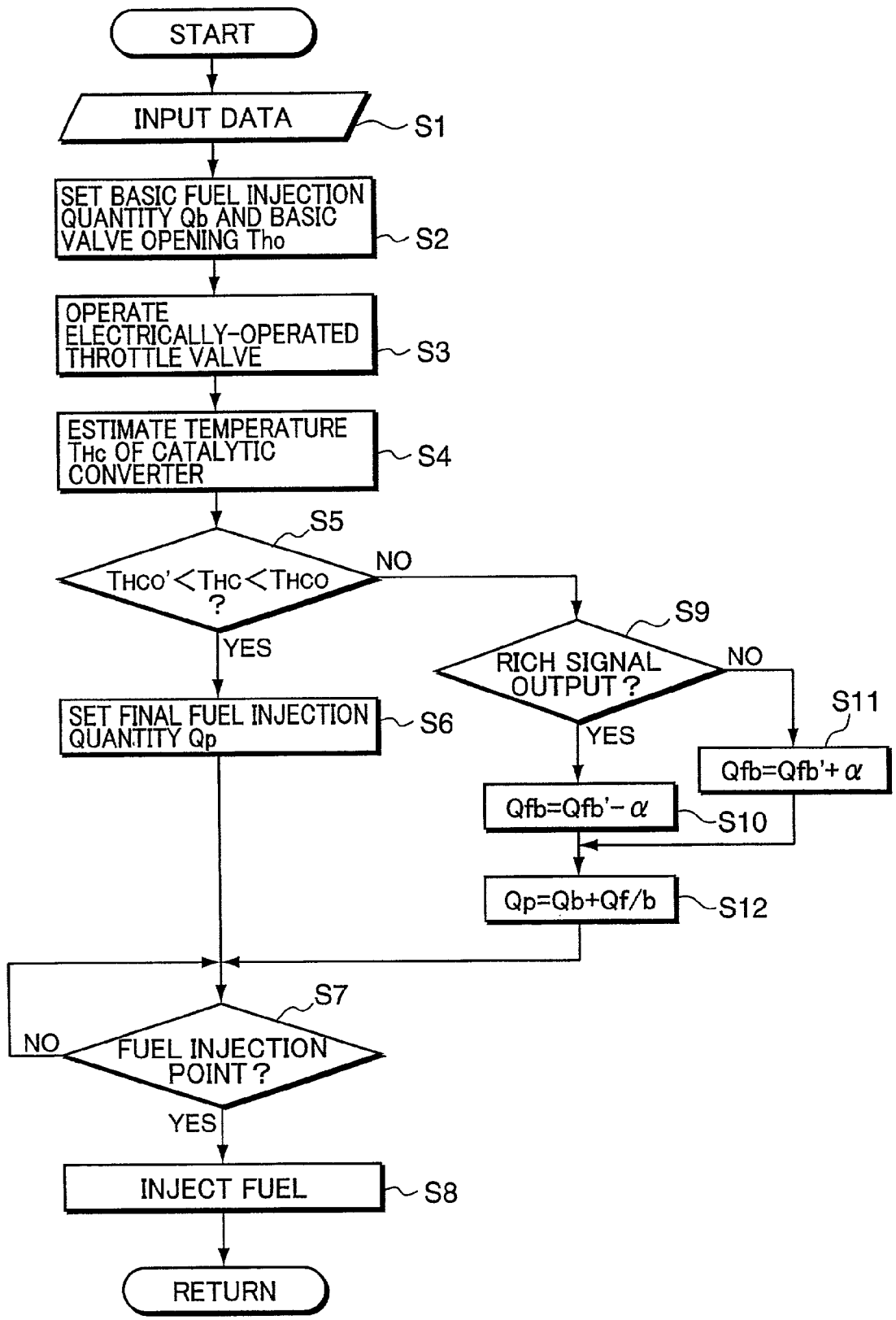
FIG. 3 is a flowchart showing fuel injection control operation performed by the exhaust-gas cleaning device.

Now, fuel injection control operation performed by the fuel injection controller 40 of the ECU 34 is described referring to a flowchart of FIG. 3. First, data on detection values of the airflow sensor 12, the first to third oxygen concentration sensors 24, 26, 28, the water temperature sensor 35, the intake air temperature sensor 36, the atmospheric pressure sensor 37, the engine rotation speed sensor 38 and the accelerator depression sensor 39 are entered to the ECU 34 (step S1).

Next, the ECU 34 sets a target engine torque read out from a preprogrammed map according to the detection values of the amount of depression of the accelerator pedal and the engine speed as well as a basic fuel injection quantity Qb and a basic opening Thθ of the electrically-operated throttle valve 13 read out from a preprogrammed map using the target engine torque and the engine speed as parameters (step S2). The ECU 34 then outputs a control signal corresponding to the basic opening Thθ to the motor 15 to operate the electrically-operated throttle valve 13 (step S3).

Next, the ECU 34 estimates temperature $T_{HC}$ of the HC-adsorbing catalytic converter 27 (step S4) and judges whether this temperature $T_{HC}$ is higher than a first reference temperature $T_{HCO}'$ which is set to about 150° C. and lower than a second reference temperature $T_{HCO}$ which is set to about 250° C. in order to determine whether the engine is in the operating condition in which HC is released from the HC-adsorbing material 27b (step S5). More specifically, the ECU 34 determines whether the engine is in the operating condition in which HC is released from the HC-adsorbing catalytic converter 27 by judging whether the engine is in a state between a point T1 after startup where HC adsorbed by the HC-adsorbing catalytic converter 27 begins to be released and a point T2 where releasing of HC is completed as depicted in FIG. 4 based on the temperature $T_{HC}$ of the HC-adsorbing catalytic converter 27.

If the judgment result in step S5 is in the affirmative, confirming that the engine is in the operating condition in which HC is released from the HC-adsorbing material 27b, a final fuel injection quantity Qp is set in such a manner that the average air-fuel ratio in the combustion chamber 4 becomes equal to about 14.5 to produce a slightly rich mixture (step S6). Then, a judgment is made to determine whether a fuel injection point has been reached (step S7). As soon as the fuel injection point is judged to have been reached, the injector 7 is caused to inject fuel as much as the final fuel injection quantity Qp (step S8).

On the other hand, if the judgment result in step S5 is in the negative, confirming that the engine is not in the operating condition in which HC is released from the HC-adsorbing material 27b, a judgment is made to determine whether the first oxygen concentration sensor 24 disposed most upstream has output a "rich" signal indicating that the oxygen concentration in the exhaust gas upstream of the three-way catalytic converter 25 is low (step S9).

If the judgment result in step S9 is in the affirmative, confirming that the average air-fuel ratio in the combustion chamber 4 is smaller than a set air-fuel ratio (the mixture is rather rich), the ECU 34 sets a new feedback control value Qf/b obtained by subtracting a specific correction value (feedback control gain) α from a feedback control value Qf/b' set in most recently executed control operation with respect to the amount of injected fuel in order to correct the air-fuel ratio to produce a leaner mixture in the combustion chamber 4 by decreasing the amount of injected fuel (step S10).

If the judgment result in step S9 is in the negative, confirming that the average air-fuel ratio in the combustion chamber 4 is larger than the set air-fuel ratio (the mixture is rather lean), the ECU 34 sets a new feedback control value Qf/b obtained by adding a specific correction value (feedback control gain) α to the feedback control value Qf/b' set in the most recently executed control operation with respect to the amount of injected fuel in order to correct the air-fuel ratio to produce a richer mixture in the combustion chamber 4 by increasing the amount of injected fuel (step S11).

Subsequently, the final fuel injection quantity Qp is calculated by adding the basic fuel injection quantity Qb and the feedback control value Qf/b (step S12) the operation flow proceeds to step S7, causing the injector 7 to inject fuel.

As stated in the foregoing discussion, the exhaust-gas cleaning device of the present embodiment comprises the HC-adsorbing catalytic converter 27 disposed in the exhaust passage 22, the HC-adsorbing catalytic converter 27 including the HC-adsorbing material 27b which adsorbs HC in the exhaust gas at low temperatures and releases adsorbed HC as the temperature increases, the oxygen storage material which occludes oxygen when the oxygen concentration in the exhaust gas is high and releases and releases occluded oxygen as the oxygen concentration in the exhaust gas decreases, and the three-way catalyst layer 27c which oxidizes HC released from the HC-adsorbing material 27b. Since this exhaust-gas cleaning device has the oxygen concentration controller including the air-fuel ratio controller 43 which controls the oxygen concentration in the exhaust gas in such a way that oxygen is released from the oxygen storage material when the engine is in the operating condition in which HC is released from the HC-adsorbing material 27b by making the concentration of oxygen contained in the exhaust gas which comes into contact with the HC-adsorbing catalytic converter 27 equal to or lower than 0.3%, preferably 0.1% or less, it is possible to effectively prevent HC from being released into the atmosphere by efficiently converting it at relatively low temperatures when HC is released from the HC-adsorbing material 27b as a result of temperature increase after engine startup.

Figure 4A:
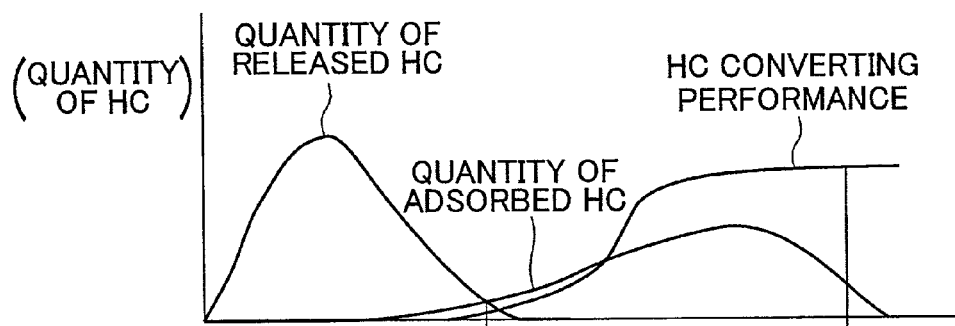
FIGS. 4A–4C are timing charts showing the injection control operation performed by the exhaust-gas cleaning device.

More particularly, most part of HC discharged from the combustion chamber 4 into the exhaust passage 22 immediately after engine startup is adsorbed by the HC-adsorbing material 27b and the amount of HC adsorbed by the HC-adsorbing material 27b gradually decreases as the temperature of the HC-adsorbing material 27b increases as shown by line indicating "QUANTITY OF RELEASED HC" of FIG. 4A. At the point T1 where the temperature of the HC-adsorbing material 27b reaches about 150° C., for instance, as shown in FIG. 4B, the amount of HC released from the HC-adsorbing material 27b exceeds the amount of HC adsorbed by the HC-adsorbing material 27b.

Figure 4B:
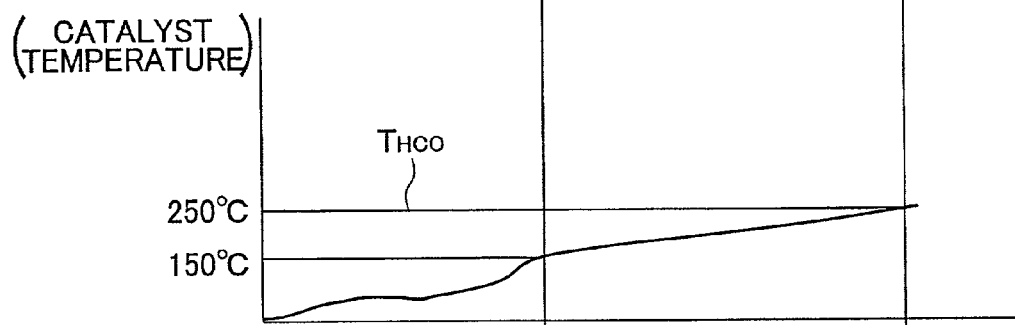
Figure 4C:
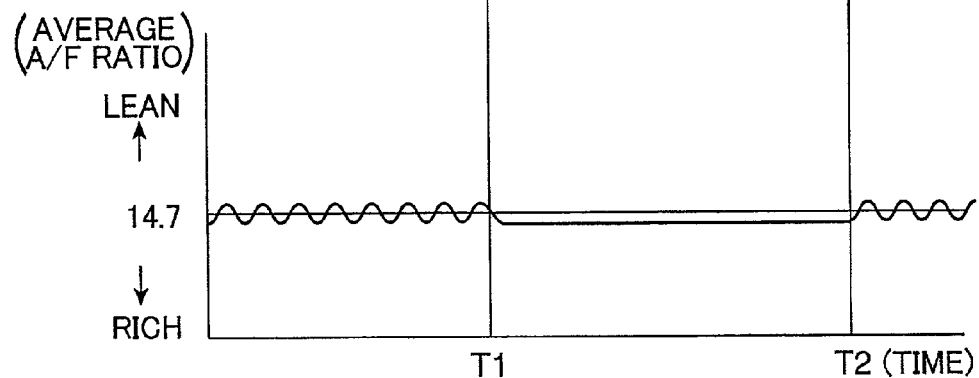

Since the oxygen concentration in the exhaust gas drops upstream of the HC-adsorbing catalytic converter 27 when the air-fuel ratio controller 43 executes the control operation including the aforementioned feedforward control by which the average air-fuel ratio in the combustion chamber 4 is set to produce a slightly rich mixture after engine startup as shown in FIG. 4C, ceric oxide ($CeO_2$) constituting the oxygen storage material is separated into $Ce_2O_3$ and O, for example, and single-atom oxygen (O) is released. Since this single-atom oxygen (O) has extremely high reactivity, it serves to eliminate HC released from the HC-adsorbing material 27b by effectively oxidizing HC and converting it into $HO_2$ and $CO_2$ at a relatively low temperature (e.g., about 150° C.) compared to a case where oxygen contained in the exhaust gas is used for converting HC.

At the point T2 the temperature of the HC-adsorbing material 27b reaches about 250° C., for example, as shown in FIG. 4B, most part of HC adsorbed by the HC-adsorbing material 27b is released and catalytic elements of the HC-adsorbing catalytic converter 27 are activated as shown by line indicating "HC CONVERTING PERFORMANCE" of FIG. 4A. Thus, at this time, the aforementioned feedforward control in which the air-fuel ratio controller 43 controls the air-fuel ratio in the combustion chamber 4 to produce a slightly rich mixture is terminated, and the engine is transferred to a normal feedforward control state, that is, the control state in which the air-fuel ratio in the combustion chamber 4 is alternately varied (perturbed) to a larger side (leaner mixture) and a lower side (richer mixture) of a set value which is set to the stoichiometric air-fuel ratio, for example, to obtain a desired oxygen concentration on the upstream side of the HC-adsorbing catalytic converter 27 as shown in FIG. 4C. With this control operation the HC-adsorbing catalytic converter 27 converts HC by use of oxygen contained in the exhaust gas.

Figure 5:
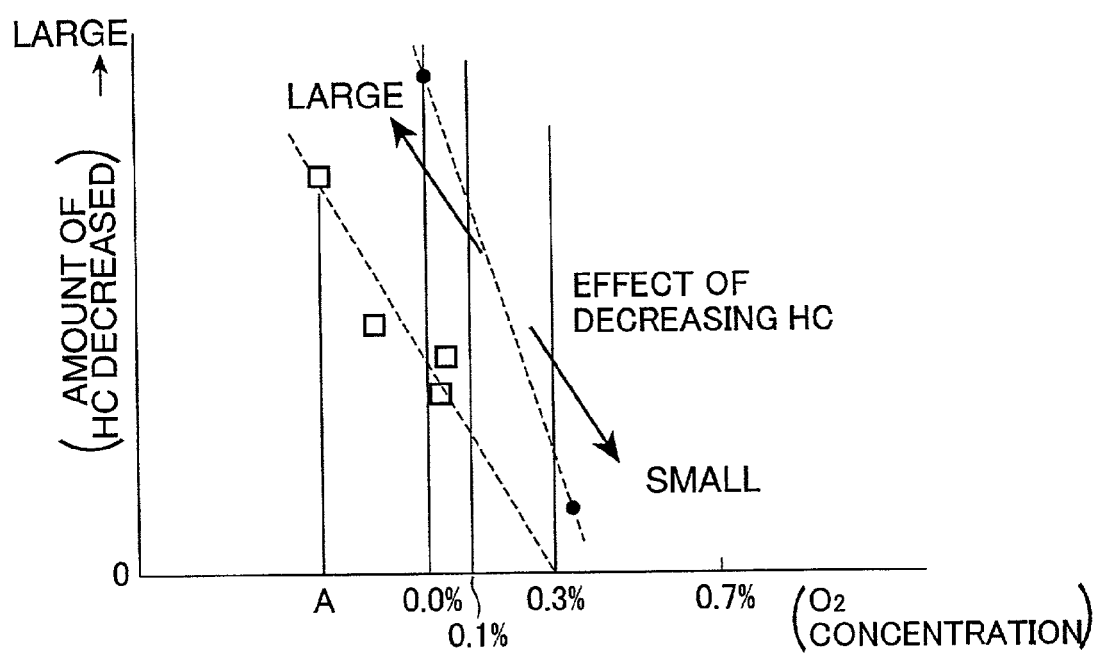
FIG. 5 is a graph showing experimental data concerning an effect of decreasing the amount of HC released into the atmosphere.

In order to confirm the effect of decreasing the amount of HC released into the atmosphere exerted by the oxygen concentration controller including the air-fuel ratio controller 43 which controls the oxygen concentration in the exhaust gas upstream of the HC-adsorbing catalytic converter 27 such that single-atom oxygen (O) having high reactivity is released from the oxygen storage material when the engine is in the operating condition in which HC is released from the HC-adsorbing material 27b, data shown in FIG. 5 was obtained in an experiment in which the amount of HC released was measured during a period of 150 seconds after engine startup with the oxygen concentration upstream of the HC-adsorbing catalytic converter 27 varied to various levels. It has been verified from the data of FIG. 5 that it is possible to effectively convert HC by setting the average air-fuel ratio to produce a rich mixture and controlling the oxygen concentration in the exhaust gas to 0.3% or less, especially by controlling the oxygen concentration in the exhaust gas to 0.1% or less.

This experimental data showing the relationship between the oxygen concentration and the amount of HC reduction was obtained by measuring the oxygen concentration between the three-way catalytic converter 25 and the HC-adsorbing catalytic converter 27 using a linear $O_2$ sensor (Type TL-6111-W1 manufactured by NTK Co., Ltd.) when the air-fuel ratio control operation was performed on an engine fitted with the HC-adsorbing catalytic converter 27 and the three-way catalytic converter 25 which is provided upstream of the HC-adsorbing catalytic converter 27. The linear $O_2$ sensor showed that the oxygen concentration in the exhaust gas was 0.0% when the mixture in the combustion chamber 4 was burnt at an average air-fuel ratio of 14.7. From this, it can be estimated that the average air-fuel ratio is 15.2 when the oxygen concentration in the exhaust gas is 0.7%, and the average air-fuel ratio is 14.9 when the oxygen concentration in the exhaust gas is 0.3%.

While the oxygen concentration in the exhaust gas is less than 0.0% at point A of FIG. 5, the amount of reducing agents contained in the exhaust gas is larger when the oxygen concentration is 0.0% and the average air-fuel ratio derived from a detection value obtained by using the aforementioned linear $O_2$ sensor becomes 14.4. The more leftward in the graph of FIG. 5, the more the amounts of HC and CO in the exhaust gas increase and the more releasing of oxygen from the oxygen storage material is accelerated compared to the point of 0.0% oxygen concentration, so that conversion of HC using oxygen released from the oxygen storage material is further accelerated.

Small squares and solid black circles in FIG. 5 represent measurements obtained with different types of catalytic converters. Specifically, the measurements indicated by the solid black circles were obtained with a catalytic converter including a honeycomb-shaped carrier, an inner layer formed by coating β-type zeolite on the carrier, and an outer layer of palladium (Pd) formed on the inner layer, with a ceria material coated on the outer layer at a ratio of 70 g per unit volume (one liter) of the catalytic carrier. On the other hand, the catalytic converter used for obtaining the measurements indicated by the squares differs from the HC-adsorbing catalytic converter of the solid black circles in that its outer layer of palladium (Pd) formed at a ratio of 105 g per liter of the catalytic carrier is impregnated with 10 g of silver (Ag) per liter of the catalytic carrier.

If the air-fuel ratio controller 43 performs such control operation that makes the ratio between the concentration of oxygen and the concentration of reducing agents in the exhaust gas flowing into the HC-adsorbing catalytic converter 27 appropriate for creating an exhaust gas atmosphere which would be obtained when a mixture in the combustion chamber 4 is burnt at an average air-fuel ratio of less than 13.5 when the engine is in the operating condition in which HC is released from the HC-adsorbing material 27b, the quality of emissions tends to be rather spoiled than improved as a result of an extreme increase in the amounts of raw HC and CO discharged from the engine into the exhaust passage 22. For this reason, when the engine is in the operating condition in which HC is released from the HC-adsorbing material 27b, it is preferable that the air-fuel ratio controller 43 perform such control operation that makes the ratio of the concentration of oxygen and the concentration of reducing agents in the exhaust gas flowing into the HC-adsorbing catalytic converter 27 appropriate for creating an exhaust gas atmosphere which would be obtained when a mixture in the combustion chamber 4 is burnt at an average air-fuel ratio between 13.5 and 14.5, so that oxygen is released from the oxygen storage material without increasing the amounts of raw HC and CO discharged into the exhaust passage 22.

If the exhaust-gas cleaning device is so constructed as to execute feedforward control operation for making the average air-fuel ratio in the combustion chamber 4 equal to or less than 14.7, e.g., about 14.5, to produce a slightly rich mixture when the engine is in the operating condition in which HC is released from the HC-adsorbing material 27b such that the oxygen concentration on the upstream side of the HC-adsorbing catalytic converter 27 matches a set value of approximately 0.3% without becoming alternately higher and lower than the set value as shown in the foregoing description of the present embodiment, it is possible to prevent a temporary increase in the oxygen concentration as well as a decrease in the amount of oxygen released from the oxygen storage material which could occur as a result of the temporary increase in the oxygen concentration. This makes it possible to constantly maintain satisfactory HC-converting performance.

Also, if the exhaust-gas cleaning device is so constructed as to execute feedback control operation for causing the oxygen concentration on the upstream side of the HC-adsorbing catalytic converter 27 to match a set value of approximately 0.3% while avoiding perturbation of the air-fuel ratio, instead of the aforementioned feedforward control operation for making the average air-fuel ratio in the combustion chamber 4 equal to or less than 14.7, e.g., about 14.5, to produce a slightly rich mixture, it is possible to prevent the aforementioned problem which would be caused by making the oxygen concentration on the upstream side of the HC-adsorbing catalytic converter 27 alternately higher and lower than the set value. This construction is also advantageous in that the performance of the HC-adsorbing catalytic converter 27 and the three-way converting function of the three-way catalytic converter 25 provided upstream of the HC-adsorbing catalytic converter 27 can be improved when the aforementioned form of feedback control is used to vary the concentrations of oxygen, HC and CO discharged from the engine.

In particular, although there is a tendency for HC-releasing temperature of the HC-adsorbing material 27b of the HC-adsorbing catalytic converter 27 to decrease and for activating temperature of the catalytic elements of the HC-adsorbing catalytic converter 27 to increase when the HC-adsorbing material 27b and the catalytic elements of the HC-adsorbing catalytic converter 27 deteriorate with the lapse of time, oxygen having high reactivity released from the oxygen storage material produces a significant effect of converting HC released from the HC-adsorbing material 27b.

In the above-described embodiment, the HC-adsorbing material 27b made of β-type zeolite impregnated with silver (Ag) which has the function of reducing the HC-releasing temperature is provided on the carrier 27a of the HC-adsorbing catalytic converter 27, and an oxidizing catalyst layer formed of the three-way catalyst layer 27c containing catalytic metal, such as palladium (Pd) or platinum (Pt), having an HC-oxidizing function is formed on the outside of the HC-adsorbing material 27b. This construction confers an advantage that HC adsorbed by the HC-adsorbing material 27b immediately after engine startup and released from the HC-adsorbing material 27b as a result of subsequent temperature increase is efficiently oxidized and decreased due to catalytic effect of the three-way catalyst layer 27c before HC thus released from the HC-adsorbing material 27b is mixed with the exhaust gas flowing through the exhaust passage 22.

Particularly because the oxygen storage material made of a ceria material like ceric oxide ($CeO_2$) is contained in the outer oxidizing catalyst layer, or the three-way catalyst layer 27c, of the HC-adsorbing catalytic converter 27 in the present embodiment so that the catalytic elements of the oxidizing catalyst layer are located close to the oxygen storage material, it is possible to efficiently oxidize HC released from the HC-adsorbing material 27b using single-atom oxygen (O) released from the ceria material constituting the oxygen storage material, and this further improves the HC-converting performance of the HC-adsorbing catalytic converter 27.

While the HC-adsorbing material 27b made of β-type zeolite impregnated with silver (Ag) is provided on the carrier 27a of the HC-adsorbing catalytic converter 27, the three-way catalyst layer 27c containing catalytic metal, such as palladium (Pd) or platinum (Pt), having an HC-oxidizing function is formed on the outside of the HC-adsorbing material 27b, and the oxygen storage material made of a ceria material like ceric oxide ($CeO_2$) is contained in the three-way catalyst layer 27c provided in an outermost layer of the HC-adsorbing catalytic converter 27 in the foregoing embodiment, the HC-adsorbing catalytic converter 27 may be constructed with a three-way catalyst, an HC-adsorbing material and an oxygen storage material mixed together.

Furthermore, although the oxygen concentration in the exhaust gas upstream of the HC-adsorbing catalytic converter 27 is controlled by adjusting the amount of injected fuel by means of the oxygen concentration controller including the air-fuel ratio controller 43 in the foregoing embodiment, this arrangement may be modified such that the oxygen concentration is controlled by adjusting the opening of the electrically-operated throttle valve 13, by adjusting the amount of fuel injected in a later injection cycle or later injection timing if the engine is so constructed to execute later injection of fuel in an expansion stroke, or the amount of intake air (secondary air) supplied through the secondary air supply passage 32 to an upstream point of the HC-adsorbing catalytic converter 27.

Furthermore, although the exhaust-gas cleaning device of the foregoing embodiment is constructed such that the oxygen concentration on the upstream side of the HC-adsorbing catalytic converter 27 matches a set value of approximately 0.3% without becoming alternately higher and lower than the set value when the engine is in the operating condition in which HC is released from the HC-adsorbing material 27b, this construction may be modified in such a way that the oxygen concentration controller including the air-fuel ratio controller 43 executes so-called dither control operation in which the air-fuel ratio in the combustion chamber 4 is forcibly made alternately larger and smaller than a set value (or caused to make perturbation) without based on the detection of perturbation of the output of the second oxygen concentration sensor 26. When such dither control operation is performed or when the feedback control operation is performed based on the detection of perturbation of an output value from the second oxygen concentration sensor 26, the amplitude of perturbation of the average air-fuel ratio may be made smaller when the engine is in the operating condition in which HC is released from the HC-adsorbing material 27b than when the engine is in the operating condition in which releasing of HC adsorbed by the HC-adsorbing material 27b has finished by setting a small feedback control gain for the air-fuel ratio control operation performed by the air-fuel ratio controller 43, for example.

Figure 6:
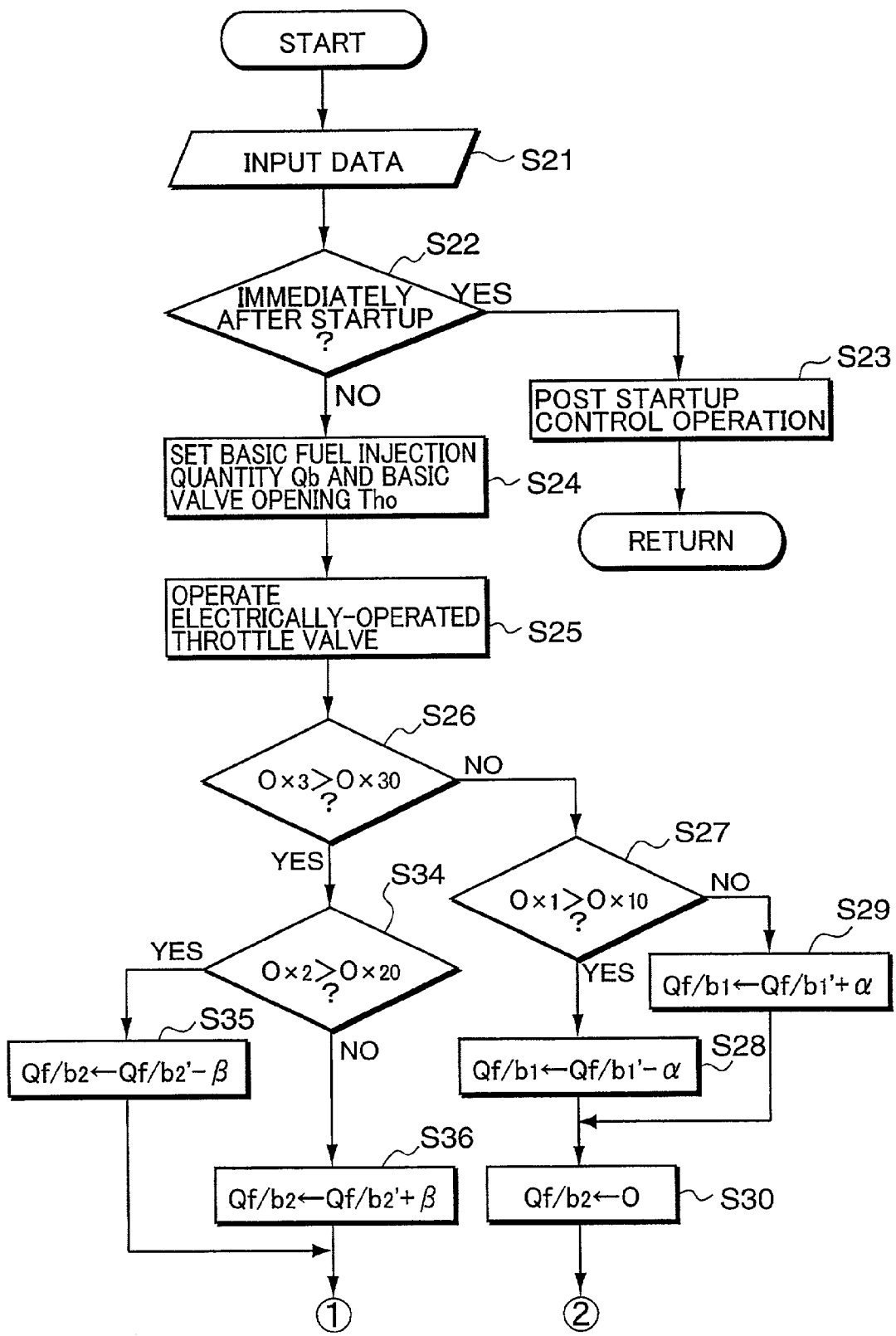
FIG. 6 is a flowchart showing a first haft of air-fuel ratio control operation performed by the exhaust-gas cleaning device.
Figure 7:
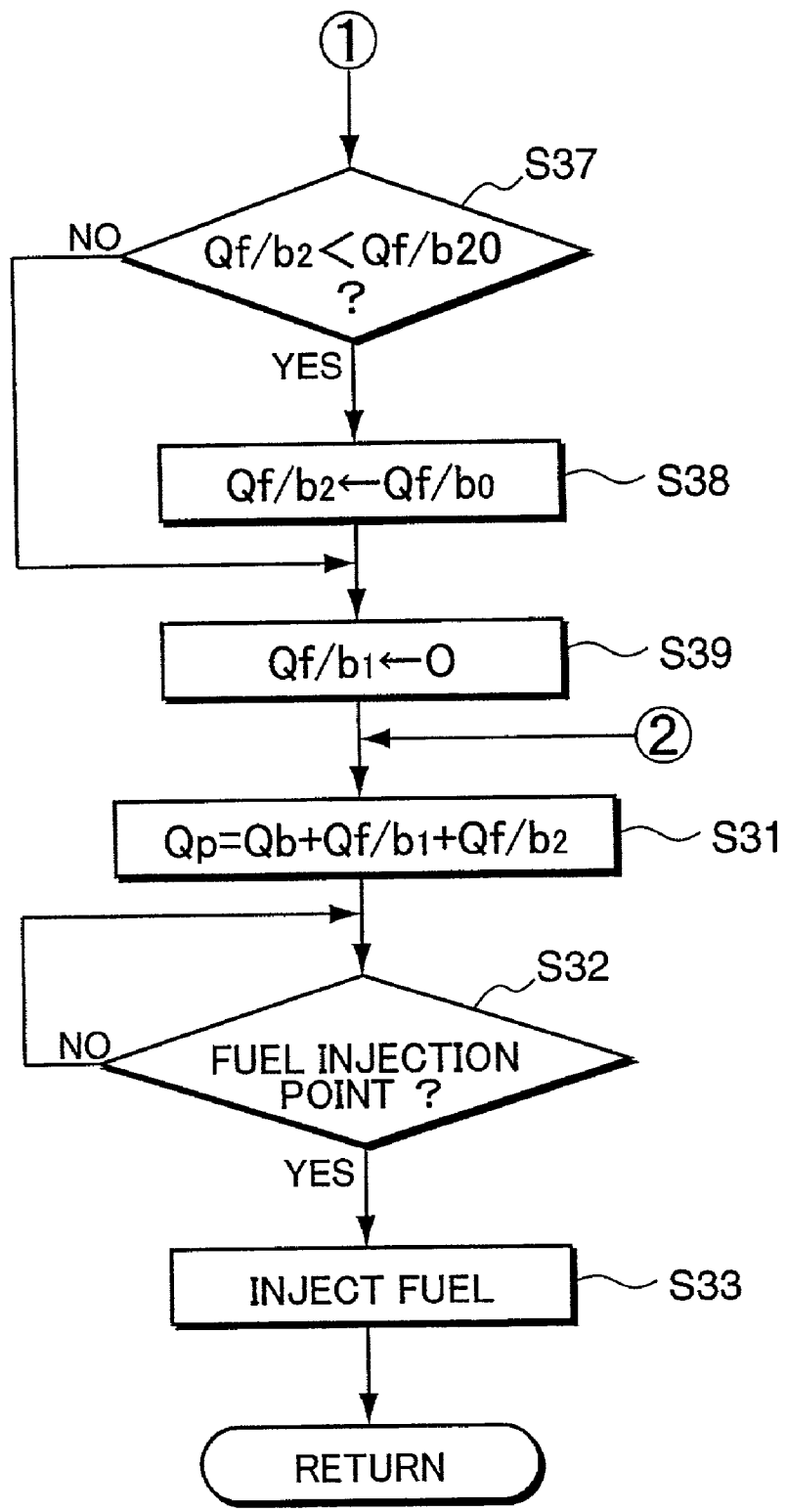
FIG. 7 is a flowchart showing a second haft of the air-fuel ratio control operation performed by the exhaust-gas cleaning device.

The air-fuel ratio control operation performed by the exhaust-gas cleaning device of the embodiment is now described referring to flowcharts of FIGS. 6 and 7. First, data detected by the individual sensors are entered to the ECU 34 (step S21), and a judgment is made to determine whether the engine is immediately after startup (step S22). If the judgment result in step S22 is in the affirmative, the air-fuel ratio is decreased to increase combustion stability, and post-startup control operation is executed to maintain a specific lift of the electrically-operated throttle valve 13 for a period of 3 to 5 seconds, for instance (step S23).

If the judgment result in step S22 is in the negative, confirming that the engine is not immediately after startup, or that the post-startup control operation has finished, the ECU 34 sets a target engine torque read out from a preprogrammed map according to the detection values of the amount of depression of the accelerator pedal and the engine speed as well as a basic fuel injection quantity Qb and a basic opening Thθ of the electrically-operated throttle valve 13 read out from a preprogrammed map using the target engine torque and the engine speed as parameters (step S24). The ECU 34 then outputs a control signal corresponding to the basic opening Thθ to the motor 15 to operate the electrically-operated throttle valve 13 (step S25).

Figure 8A:
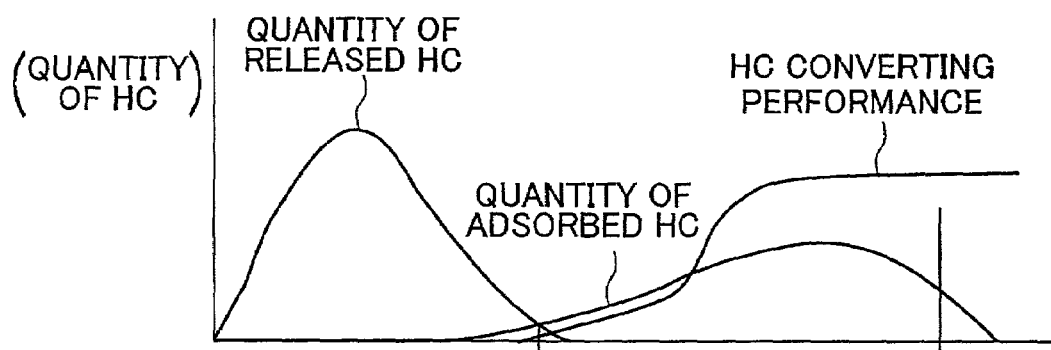
FIGS. 8A–8C are timing charts showing the air-fuel ratio control operation performed by the exhaust-gas cleaning device.
Figure 8B:
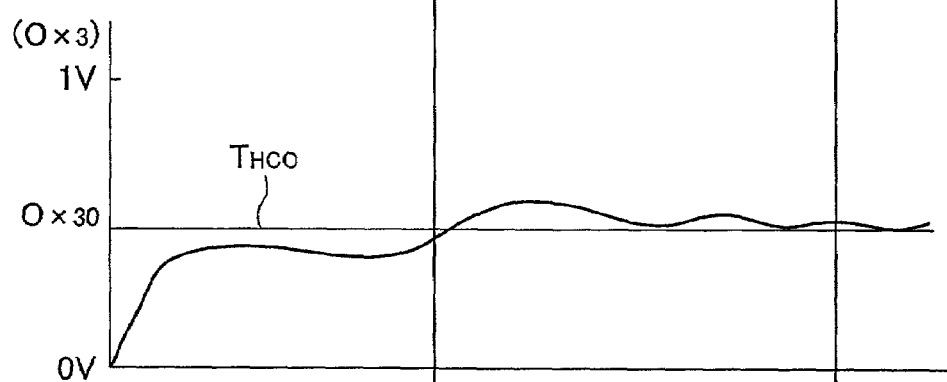

Then, a judgment is made to determine whether the engine is in the operating condition in which HC is released from the HC-adsorbing material 27b of the HC-adsorbing catalytic converter 27 by comparing a value $O_{X3}$ derived from the output signal of the third oxygen concentration sensor 28 with a preset reference oxygen concentration value $O_{X30}$. More specifically, the ECU 34 judges whether the oxygen concentration in the exhaust gas is lower than the preset reference oxygen concentration value $O_{X30}$ with the amount of HC released from the HC-adsorbing material 27b becoming larger than the amount of HC adsorbed by the HC-adsorbing material 27b as shown in FIGS. 8A and 8B according to the output signal value $O_{X3}$ derived from the third oxygen concentration sensor 28 (step S26). Instead of this judgment (step S26), the ECU 34 may judge whether the engine is in the operating condition in which HC is released from the HC-adsorbing material 27b of the HC-adsorbing catalytic converter 27 by determining the degree of releasing of HC from the HC-adsorbing material 27b based on the rate of change $?O_{X3}$ of the output signal value $O_{X3}$ and a preset rate of change $?O_{X30}$ of the reference oxygen concentration value $O_{X30}$. This latter judgment may be supplemented by an additional judgment to make sure that the engine is in the operating condition in which HC is released from the HC-adsorbing material 27b with the engine temperature reaching or exceeding a specific temperature based on the temperature of the engine cooling water detected by the water temperature sensor 35.

If the judgment result in step S26 is in the negative, confirming that the engine is not in the operating condition in which HC is released from the HC-adsorbing material 27b of the HC-adsorbing catalytic converter 27, a judgment is made to determine whether the oxygen concentration in the exhaust gas upstream of the three-way catalytic converter 25 is lower than a value corresponding to a combustion state at a set air-fuel ratio (the mixture is rather rich) by comparing a value $O_{X1}$ derived from the output signal of the first oxygen concentration sensor 24 with a preset reference oxygen concentration value $O_{X10}$ (step S27).

If the judgment result in step S27 is in the affirmative, confirming that the average air-fuel ratio in the combustion chamber 4 is smaller than the set air-fuel ratio (the mixture is rather rich), the ECU 34 sets a new first feedback control value Qf/b1 obtained by subtracting a specific first correction value (first feedback control gain) a from a first feedback control value Qf/b1' set in most recently executed control operation with respect to the amount of injected fuel in order to correct the air-fuel ratio to produce a leaner mixture in the combustion chamber 4 by decreasing the amount of injected fuel (step S28).

If the judgment result in step S27 is in the negative, confirming that the average air-fuel ratio in the combustion chamber 4 is larger than the set air-fuel ratio (the mixture is rather lean), the ECU 34 sets a new first feedback control value Qf/b1 obtained by adding a specific first correction value (first feedback control gain) α to the first feedback control value Qf/b1' set in the most recently executed control operation with respect to the amount of injected fuel in order to correct the air-fuel ratio to produce a richer mixture in the combustion chamber 4 by increasing the amount of injected fuel (step S29).

Subsequently, a later-described second feedback control value Qf/b2 is reset to 0 (step S30), the final fuel injection quantity Qp is calculated by adding the aforementioned basic fuel injection quantity Qb, first feedback control value Qf/b1 and second feedback control value Qf/b2 (step S31), and a judgment is made to determine whether a fuel injection point has been reached (step S32). As soon as the fuel injection point is judged to have been reached, the injector 7 is caused to inject fuel as much as the final fuel injection quantity Qp (step S33).

If the judgment result in step S26 is in the affirmative, confirming that the engine is in the operating condition in which HC is released from the HC-adsorbing material 27b of the HC-adsorbing catalytic converter 27, a judgment is made to determine whether the oxygen concentration in the exhaust gas upstream of the HC-adsorbing catalytic converter 27 is lower than a value corresponding to a combustion state at an air-fuel ratio of about 14.5 (the mixture is rather rich) by comparing a value $O_{X2}$ derived from the output signal of the second oxygen concentration sensor 26 which is disposed between the three-way catalytic converter 25 and the HC-adsorbing catalytic converter 27 with a preset reference oxygen concentration value $O_{X2o}$ (step S34).

If the judgment result in step S34 is in the affirmative, confirming that the average air-fuel ratio in the combustion chamber 4 is smaller than the aforementioned air-fuel ratio of 14.5 (the mixture is rather rich), the ECU 34 sets a new second feedback control value Qf/b2 obtained by subtracting a specific second correction value (second feedback control gain) β from a second feedback control value Qf/b2' set in most recently executed control operation with respect to the amount of injected fuel in order to correct the air-fuel ratio to produce a leaner mixture in the combustion chamber 4 by decreasing the amount of injected fuel (step S35).

The second correction value β is set to a smaller value than the aforementioned first correction value α. As a consequence, the feedback control gain for the air-fuel ratio control operation performed by the air-fuel ratio controller 43 is set to a smaller value when the engine is in the operating condition in which HC is released from the HC-adsorbing material 27b than when the engine is in the operating condition in which releasing of HC adsorbed by the HC-adsorbing material 27b has finished or than when the engine is in the normal operating condition in which HC is adsorbed by the HC-adsorbing material 27b.

If the judgment result in step S34 is in the negative, confirming that the average air-fuel ratio in the combustion chamber 4 is larger than the aforementioned air-fuel ratio of 14.5 (the mixture is rather lean), the fuel injection controller 40 sets a new second feedback control value Qf/b2 obtained by adding a specific second correction value (second feedback control gain) β to the second feedback control value Qf/b2' set in most recently executed control operation with respect to the amount of injected fuel in order to correct the air-fuel ratio to produce a richer mixture in the combustion chamber 4 by increasing the amount of injected fuel (step S36).

Subsequently, a judgment is made to determine whether there is a possibility for the average air-fuel ratio in the combustion chamber 4 to become larger than the stoichiometric air-fuel ratio if the final fuel injection quantity Qp is set based on the aforementioned second feedback control value Qf/b2 by judging whether or not the final fuel injection quantity Qp is smaller than a preset reference feedback control value Qf/b2o (step S37).

If the judgment result in step S37 is in the affirmative, confirming that there is a possibility for the average air-fuel ratio in the combustion chamber 4 to become larger than the stoichiometric air-fuel ratio, a feedback control value Qf/bo capable of preventing the average air-fuel ratio from becoming larger than the stoichiometric air-fuel ratio is set as the aforementioned second feedback control value Qf/b2 (step S38). Then, after resetting the first feedback control value Qf/b1 is to 0 (step S39), the operation flow proceeds to step S31, causing the injector 7 to inject fuel as much as the final fuel injection quantity Qp.

As stated in the foregoing discussion, the exhaust-gas cleaning device of the present embodiment comprises the oxygen concentration controller including the air-fuel ratio controller 43 which performs the feedback control operation to make the average air-fuel ratio in the combustion chamber 4 alternately larger and smaller than a set air-fuel ratio based on the oxygen concentration in the exhaust gas upstream of the HC-adsorbing catalytic converter 27. Even if this exhaust-gas cleaning device is constructed such that the feedback control gain for the air-fuel ratio control operation performed by the air-fuel ratio controller 43 is set to a smaller value when the engine is in the operating condition in which HC is released from the HC-adsorbing material 27b than when the engine is in the normal operating condition in which releasing of HC from the HC-adsorbing material 27b has finished, it is possible to effectively prevent HC from being released into the atmosphere by efficiently converting it at relatively low temperatures when HC is released from the HC-adsorbing material 27b.

Figure 8C:
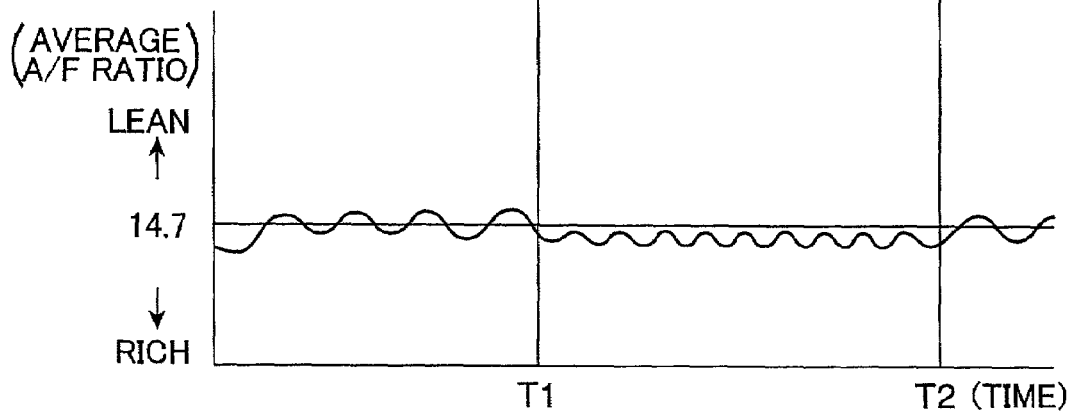

Specifically, since feedback control of the air-fuel ratio is performed by the air-fuel ratio controller 43 with the average air-fuel ratio in the combustion chamber 4 slightly decreased to produce a rather rich mixture at the point T1 shown in FIG. 8C when it has been verified from the output signal value $O_{X3}$ of the third oxygen concentration sensor 28 that the engine has reached the operating condition in which HC is released from the HC-adsorbing material 27b as a result of temperature increase of the HC-adsorbing catalytic converter 27 after engine startup as shown in FIG. 8B, and the feedback control gain for the air-fuel ratio control operation performed by the air-fuel ratio controller 43 is set to a smaller value when the engine is in the operating condition in which HC is released from the HC-adsorbing material 27b than when the engine is in the normal operating condition in which releasing of HC from the HC-adsorbing material 27b has finished (point T2 and later), it is possible to prevent a temporary increase in the average air-fuel ratio in the combustion chamber 4 in the operating condition in which HC is released from the HC-adsorbing material 27b. Therefore, it is possible to release single-atom oxygen (O) having high reactivity from the oxygen storage material by decreasing the oxygen concentration in the exhaust gas upstream of the HC-adsorbing catalytic converter 27 and thereby convert HC released from the HC-adsorbing material 27b efficiently at a low temperature of about 150° C. thanks to the catalytic effect of the three-way catalyst layer 27c using single-atom oxygen (O). Moreover, this arrangement also improves CO- and NOx-converting performance of the exhaust-gas cleaning device.

In particular, because the exhaust-gas cleaning device of the present embodiment is so constructed to set a feedback control value Qf/b capable of preventing the average air-fuel ratio from becoming larger than the stoichiometric air-fuel ratio as the aforementioned second feedback control value Qf/b2 when it has been verified that there is a possibility for the average air-fuel ratio in the combustion chamber 4 to become larger than the stoichiometric air-fuel ratio in the execution of the air-fuel ratio control operation based on the aforementioned second feedback control gain set when the engine is in the operating condition in which HC is released from the HC-adsorbing material 27b, it is possible to prevent a decrease in the amount of oxygen released from the oxygen storage material which could occur as a result of a temporary increase in the oxygen concentration on the upstream side of the HC-adsorbing catalytic converter 27 when the engine is in the operating condition in which HC is released from the HC-adsorbing material 27b.

Although the exhaust-gas cleaning device of the present embodiment is so constructed to execute the feedback control operation using the second correction value β which is set based on the detection value of the second oxygen concentration sensor 26 when the engine is in the operating condition in which HC is released from the HC-adsorbing material 27b, and to execute the feedback control operation using the first correction value α which is set based on the detection value of the first oxygen concentration sensor 24 when the engine is in other operating condition, the embodiment may be modified in such a manner that the exhaust-gas cleaning device simultaneously executes the feedback control operation using the first correction value α set based on the detection value of the first oxygen concentration sensor 24 and the feedback control operation using the second correction value β set based on the detection value of the second oxygen concentration sensor 26 even when HC is being released from the HC-adsorbing material 27b. In other words, the final fuel injection quantity Qp may be obtained by adding both the first feedback control value Qf/b1 and the second feedback control value Qf/b2 to the basic fuel injection quantity Qb.

While the invention has been described, by way of example, with reference to the specific embodiment in which the engine is provided with the fuel injection device, or the injector 7, for injecting fuel directly into the combustion chamber 4 in each cylinder 2, the invention is applicable to an engine in which fuel is injected into intake ports.

This application is based on Japanese patent application serial no. 2001-51758, filed in Japanese Patent office on Feb. 27, 2001, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust-gas cleaning device for an engine, said exhaust-gas cleaning device comprising:
   an HC-adsorbing catalytic converter disposed in an exhaust passage, the HC-adsorbing catalytic converter including:
   an HC-adsorbing material which adsorbs HC contained in exhaust gas and releases adsorbed HC as temperature increases;
   an oxygen storage material which occludes oxygen when the concentration of oxygen in the exhaust gas is high and releases occluded oxygen as the oxygen concentration drops; and
   an oxidizing catalytic metal which oxidizes HC released from the HC-adsorbing material; and
   an oxygen concentration controller which controls the oxygen concentration in the exhaust gas on the upstream side of the HC-adsorbing catalytic converter in such a manner that oxygen is released from the oxygen storage material when the engine is in an operating condition in which HC is released from the HC-adsorbing material, said oxygen concentration controller including an air-fuel ratio controller for controlling average air-fuel ratio in a combustion chamber of the engine,
   wherein the air-fuel ratio controller controls the engine in such a manner that a value corresponding to the ratio between the oxygen concentration and the concentration of a reducing agent contained in the exhaust gas flowing into the HC-adsorbing catalytic converter becomes appropriate for creating an exhaust gas atmosphere which is obtained by burning a mixture at an average air-fuel ratio between 13.5 and 14.5 in the combustion chamber so that oxygen is released from the oxygen storage material when the engine is in the operating condition in which HC is released from the HC-adsorbing material.

2. The exhaust-gas cleaning device according to claim 1, wherein the oxygen concentration controller controls the engine in such a manner that the oxygen concentration in the exhaust gas on the upstream side of the HC-adsorbing catalytic converter matches a set value without becoming alternately higher and lower than the set value.

3. The exhaust-gas cleaning device according to claim 1, wherein the air-fuel ratio controller performs feedback control operation for making the average air-fuel ratio in the combustion chamber alternately higher and lower than a set air-fuel ratio based on the oxygen concentration in the exhaust gas on the upstream side of the HC-adsorbing catalytic converter, and wherein feedback control gain for air-fuel ratio control operation performed by the air-fuel ratio controller is set to a small value when the engine is in the operating condition in which HC is released from the HC-adsorbing material than when the engine is in an operating condition in which releasing of HC from the HC-adsorbing material has finished.

4. The exhaust-gas cleaning device according to claim 1, wherein the HC-adsorbing material is disposed on a carrier of the HC-adsorbing catalytic converter and an oxidizing catalyst layer is formed on the outside of the HC-adsorbing material.

5. The exhaust-gas cleaning device according to claim 4, wherein the oxygen storage material is contained in the oxidizing catalyst layer.

6. An exhaust-gas cleaning device for an engine, said exhaust-gas cleaning device comprising:
   an HC-adsorbing catalytic converter disposed in an exhaust passage, the HC-adsorbing catalytic convener including:
   an HC-adsorbing material which adsorbs HC contained in exhaust-gas and releases adsorbed HC as temperature increases;
   an oxygen storage material which occludes oxygen when the concentration of oxygen in the exhaust gas is high and releases occluded oxygen as the oxygen concentration drops; and
   an oxidizing catalytic metal which oxidizes HC released from the HC-adsorbing material; and
   an oxygen concentration controller which controls the oxygen concentration in the exhaust gas on the upstream side of the HC-adsorbing catalytic converter in such a manner that oxygen is released from the oxygen storage material when the engine is in an operating condition in which HC is released from the HC-adsorbing material, and the oxygen concentration controller including:
   an air-fuel ratio controller for controlling average air-fuel ratio in a combustion chamber of the engine, wherein the air-fuel ratio controller controls the engine in such a manner that a value corresponding to the ratio between the oxygen concentration and the concentration of a reducing agent contained in the exhaust gas flowing into the HC-adsorbing catalytic converter becomes appropriate for creating an exhaust gas atmosphere which is obtained by burning a mixture at an average air-fuel ratio of 14.7 or less in the combustion chamber so that oxygen is released from the oxygen storage material when the engine is in the operating condition in which HC is released from the HC-adsorbing material and
   the air-fuel ratio controller performs feedback control operator for making the average air-fuel ratio in the combustion chamber alternately higher and lower than a set air-fuel ratio based on the oxygen concentration in the exhaust gas on the upstream side of the HC-adsorbing catalytic converter, and wherein feedback control gain for air-fuel ratio control operation performed by the air-fuel ratio controller is set to a small value where the engine is in the operating condition in which HC is released from the HC-adsorbing material than when the engine is in an operating condition in which releasing of HC from the HC-adsorbing material has finished.

7. An exhaust-gas cleaning device for an engine, said exhaust-gas cleaning device comprising:

HC-adsorbing catalytic converting means disposed in an exhaust passage, the HC-adsorbing catalytic converting means including:

an HC-adsorbing material which adsorbs HC contained in exhaust gas and releases adsorbed HC as temperature increases;

an oxygen storage material which occludes oxygen when the concentration of oxygen in the exhaust gas is high and releases occluded oxygen as the oxygen concentration drops; and an oxidizing catalytic metal which oxidizes HC released from the HC-adsorbing material; and an oxygen concentration controlling means for controlling the oxygen concentration in the exhaust gas on the upstream side of the HC-adsorbing catalytic converter in such a manner that oxygen is released from the oxygen storage material when the engine is in an operating condition in which HC is released from the HC-adsorbing material and the oxygen concentration controlling means controls the engine in such a manner that the oxygen concentration in the exhaust gas on the upstream side of the HC-adsorbing catalytic converting means becomes equal to or less than 0.3% when the engine is in the operating condition in which HC is released from the HC-adsorbing material.

* * * * *